(12) United States Patent
Yoshiwara

(10) Patent No.: US 8,975,350 B2
(45) Date of Patent: Mar. 10, 2015

(54) POLYMERIZABLE COMPOSITION, RESIN MOLDINGS AND MANUFACTURING PROCESS THEREFOR, AND LAMINATES

(75) Inventor: Akihiko Yoshiwara, Tokyo (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 14/235,745

(22) PCT Filed: Jul. 6, 2012

(86) PCT No.: PCT/JP2012/067332
§ 371 (c)(1),
(2), (4) Date: Apr. 9, 2014

(87) PCT Pub. No.: WO2013/018506
PCT Pub. Date: Feb. 7, 2013

(65) Prior Publication Data
US 2014/0256878 A1    Sep. 11, 2014

(30) Foreign Application Priority Data

Jul. 29, 2011   (JP) .................................. 2011-166386

(51) Int. Cl.

| | | |
|---|---|---|
| *C08F 30/08* | (2006.01) | |
| *C08F 2/02* | (2006.01) | |
| *C08K 13/02* | (2006.01) | |
| *C08G 61/08* | (2006.01) | |
| *C08K 5/5419* | (2006.01) | |
| *C08L 65/00* | (2006.01) | |
| *C08K 3/00* | (2006.01) | |
| *C08K 3/22* | (2006.01) | |
| *C08F 232/08* | (2006.01) | |

(52) U.S. Cl.
CPC ................ *C08K 13/02* (2013.01); *C08G 61/08* (2013.01); *C08K 5/5419* (2013.01); *C08L 65/00* (2013.01); *C08K 3/0033* (2013.01); *C08G 2261/3325* (2013.01); *C08G 2261/418* (2013.01); *C08K 2003/2227* (2013.01); *C08F 232/08* (2013.01)
USPC .......................................... 526/279; 524/856

(58) Field of Classification Search
USPC ........................................ 526/279; 524/856
See application file for complete search history.

(56) References Cited

U.S. PATENT DOCUMENTS

| | | | |
|---|---|---|---|
| 5,055,499 A | 10/1991 | Endo et al. | |
| 2006/0154099 A1 | 7/2006 | Kodemura et al. | |
| 2011/0177239 A1* | 7/2011 | Okada ........................... | 427/162 |

FOREIGN PATENT DOCUMENTS

| | | |
|---|---|---|
| EP | 0439650 A1 | 8/1991 |
| JP | 2001-64488 A | 3/2001 |
| JP | 2010-95457 A | 4/2010 |
| WO | WO 2005/000579 A1 | 1/2005 |
| WO | WO 2008/120721 A1 | 10/2008 |

OTHER PUBLICATIONS

PCT/ISA/210—International Search Report mailed on Aug. 21, 2012, issued in PCT/JP2012/067332.

* cited by examiner

*Primary Examiner* — Kuo-Liang Peng
(74) *Attorney, Agent, or Firm* — Birch, Stewart, Kolasch & Birch, LLP

(57) ABSTRACT

The invention pertains to a polymerizable composition comprising a cycloolefin monomer, a coupling agent (A) that has a cycloolefin structure, a coupling agent (B) that includes at least one compound represented by a formula (1) (provided that the coupling agent (B) excludes the coupling agent (A)), a filler, and a metathesis polymerization catalyst, a weight ratio (coupling agent (A)/coupling agent (B)) of the coupling agent (A) to the coupling agent (B) being 0.1 to 1.5, $$(X)_{n-m}\text{-M-}(Y)_m \qquad (1)$$

wherein M is a silicon atom, a titanium atom, an aluminum atom, or a zirconium atom, X is a hydrolyzable group, Y is a hydrocarbon group having 1 to 50 carbon atoms that is unsubstituted or substituted with a substituent that includes an oxygen atom, a nitrogen atom, a sulfur atom, a halogen atom, or a silicon atom, provided that at least one Y is a group having a solubility parameter value (SP value) of 7.5 to 10, m is an integer from 1 to 3, and n is a valence of M. A resin formed article that exhibits excellent heat resistance and impact resistance can be obtained by utilizing the polymerizable composition.

18 Claims, No Drawings

POLYMERIZABLE COMPOSITION, RESIN MOLDINGS AND MANUFACTURING PROCESS THEREFOR, AND LAMINATES

TECHNICAL FIELD

The invention relates to a polymerizable composition, a resin formed article that is produced using the polymerizable composition, and exhibits excellent heat resistance and impact resistance, a method for producing the same, and a laminate that includes a layer formed of the resin formed article.

BACKGROUND ART

A cycloolefin polymer obtained by polymerizing a polymerizable monomer including a cycloolefin monomer (e.g., norbornene-based monomer) in the presence of a metathesis polymerization catalyst exhibits excellent electrical properties, mechanical properties, impact resistance, heat resistance, weatherability, and the like. Therefore, the cycloolefin polymer has attracted attention as a resin material for forming a formed article used in various fields.

When using the cycloolefin polymer as a resin material, a filler such as a glass reinforcement material may be added to improve various properties (e.g., rigidity). However, the cycloolefin polymer has very low polarity, and exhibits poor adhesion to the filler.

In order to improve adhesion between the cycloolefin polymer and the filler, the surface of the filler may be treated in advance using a coupling agent or the like. For example, Patent Document 1 discloses a polymerizable composition that includes a magnetic material and bulk-polymerizable monomer, wherein the surface of the magnetic material has been treated with a silane coupling agent or the like.

However, since it is necessary to treat the surface of the filler in advance, the operation is complex. Moreover, a resin formed article that exhibits the desired heat resistance and impact resistance may not be obtained even when using such a surface-treated filler.

RELATED-ART DOCUMENT

Patent Document

Patent Document 1: WO2008/120721

SUMMARY OF THE INVENTION

Technical Problem

The invention was conceived in view of the above situation. An object of the invention is to provide a polymerizable composition that makes it possible to efficiently produce a resin formed article that exhibits excellent heat resistance and impact resistance, a resin formed article produced using the polymerizable composition, a method for producing the same, and a laminate that includes a layer formed of the resin formed article.

Solution to Problem

The inventor of the invention conducted extensive studies in order to achieve the above object. As a result, the inventor found that a resin formed article that exhibits excellent heat resistance and impact resistance can be efficiently produced by subjecting a composition that includes a cycloolefin monomer, a filler, and a metathesis polymerization catalyst to bulk polymerization, the composition further including a specific amount of a coupling agent (A) that has a cycloolefin structure, and a specific amount of a coupling agent (B) that includes at least one compound represented by the formula (1): $(X)_{n-m}\text{-}M\text{-}(Y)_m$ (wherein M is a silicon atom (Si), a titanium atom (Ti), an aluminum atom (Al), or a zirconium atom (Zr), X is a hydrolyzable group, Y is a hydrocarbon group having 1 to 50 carbon atoms that is unsubstituted or substituted with a substituent that includes an oxygen atom, a nitrogen atom, a sulfur atom, a halogen atom, or a silicon atom, provided that at least one Y is a group having a solubility parameter value (SP value) of 7.5 to 10, m is an integer from 1 to 3, and n is the valence of M). This finding has led to the completion of the invention.

A first aspect of the invention provides the following polymerizable composition (see (1) to (4)).

(1) A polymerizable composition including a cycloolefin monomer, a coupling agent (A) that has a cycloolefin structure, a coupling agent (B) that includes at least one compound represented by the formula (1) (provided that the coupling agent (B) excludes the coupling agent (A)), a filler, and a metathesis polymerization catalyst, the weight ratio (coupling agent (A)/coupling agent (B)) of the coupling agent (A) to the coupling agent (B) being 0.1 to 1.5.

(2) The polymerizable composition according to (1), further including a dispersant.

(3) The polymerizable composition according to (1) or (2), wherein the compound represented by the formula (1) is a compound in which Y in the formula (1) is a group that does not include an active hydrogen group.

(4) A two-pack polymerizable composition including a first pack and a second pack, the polymerizable composition according to any one of (1) to (3) being divided into the first pack and the second pack, the first pack including the cycloolefin monomer, the coupling agent (A), the coupling agent (B), and the filler, and the second pack including the metathesis polymerization catalyst.

A second aspect of the invention provides the following resin formed article (see (5) and (6)).

(5) A crosslinkable resin formed article obtained by subjecting the polymerizable composition according to any one of (1) to (3), or a mixture of the first pack and the second pack included in the two-pack polymerizable composition according to (4) to bulk polymerization.

(6) A crosslinked resin formed article obtained by subjecting the polymerizable composition according to any one of (1) to (3), or a mixture of the first pack and the second pack included in the two-pack polymerizable composition according to (4) to bulk polymerization and crosslinking.

A third aspect of the invention provides the following laminate (see (7)).

(7) A laminate including a layer formed of the crosslinkable resin formed article according to (5) or the crosslinked resin formed article according to (6).

A fourth aspect of the invention provides the following method for producing a resin formed article (see (8)).

(8) A method for producing a resin formed article including:
a first step that mixes a cycloolefin monomer, a coupling agent (A) that has a cycloolefin structure, a coupling agent (B) that includes at least one compound represented by the formula (1) (provided that the coupling agent (B) excludes the coupling agent (A)), and a filler to obtain a mixture, and allows the mixture to stand at −10 to +100° C. for at least 4 hours to prepare a first pack;
a second step that prepares a second pack that includes a metathesis polymerization catalyst; and a third step that mixes the first pack and the second pack to prepare a polymerizable composition, and subjects the polymerizable composition to bulk polymerization.

Advantageous Effects of the Invention

A resin formed article that exhibits excellent heat resistance and impact resistance, and a laminate that includes a layer formed of the resin formed article can be obtained by utilizing the polymerizable composition according to the first aspect of the invention.

A resin formed article in which a cycloolefin polymer and a filler exhibit excellent adhesion to each other, and which exhibits excellent heat resistance and impact resistance can be efficiently obtained by utilizing the method for producing a resin formed article according to the fourth aspect of the invention without treating the surface of the filler in advance.

DESCRIPTION OF EMBODIMENTS

A polymerizable composition, a resin formed article, a method for producing a resin formed article, and a laminate according to several exemplary embodiments of the invention are described in detail below.
1) Polymerizable Composition
A polymerizable composition according to one embodiment of the invention includes a cycloolefin monomer, a coupling agent (A) that has a cycloolefin structure (hereinafter referred to as "coupling agent (A)"), a coupling agent (B) that includes at least one compound represented by the formula (1) (hereinafter referred to as "coupling agent (B)"), a filler, and a metathesis polymerization catalyst.
Cycloolefin Monomer
The cycloolefin monomer used for the polymerizable composition according to one embodiment of the invention is a compound having an alicyclic structure that includes a polymerizable carbon-carbon double bond. Note that the term "polymerizable carbon-carbon double bond" used herein refers to a carbon-carbon double bond that is involved in ring-opening metathesis polymerization.

Examples of the alicyclic structure of the cycloolefin monomer include a monocyclic ring, a polycyclic ring, a fused polycyclic ring, a bridged ring, a combination thereof, and the like.

The cycloolefin monomer is preferably a polycyclic cycloolefin monomer, and more preferably a tricyclic, tetracyclic, or pentacyclic cycloolefin monomer since a resin formed article that exhibits excellent mechanical strength and heat resistance can be obtained.

The number of carbon atoms of the alicyclic structure is not particularly limited, but is normally 4 to 30, preferably 5 to 20, and still more preferably 5 to 15.

The cycloolefin monomer may be substituted with a substituent such as an alkyl group having 1 to 10 carbon atoms (e.g., methyl group, ethyl group, propyl group, or butyl group), an alkenyl group having 2 to 10 carbon atoms (e.g., vinyl group), an alkylidene group having 2 to 10 carbon atoms (e.g., ethylidene group), an aryl group having 6 to 14 carbon atoms (e.g., phenyl group, tolyl group, or naphthyl group), or a polar group (e.g., carboxyl group, acid anhydride group, alkoxycarbonyl group having 1 to 10 carbon atoms, acyloxy group, oxy group, cyano group, or halogen atom).

The cycloolefin monomer used for the polymerizable composition according to one embodiment of the invention may be a compound that includes a crosslinkable carbon-carbon unsaturated bond in addition to a polymerizable carbon-carbon double bond, or may be a compound that does not include a crosslinkable carbon-carbon unsaturated bond in addition to a polymerizable carbon-carbon double bond.

When using a compound that includes a crosslinkable carbon-carbon unsaturated bond in addition to a polymerizable carbon-carbon double bond, the mechanical strength of the resulting crosslinked resin formed article and laminate can be improved. Note that the term "crosslinkable carbon-carbon unsaturated bond" used herein refers to a carbon-carbon unsaturated bond that is not involved in ring-opening metathesis polymerization, but is involved in the crosslinking reaction. The term "crosslinking reaction" used herein refers to a reaction that forms a crosslinked structure. Note that the term "crosslinking reaction" used herein normally refers to a radical crosslinking reaction or a metathesis crosslinking reaction (particularly a radical crosslinking reaction).

Examples of the crosslinkable carbon-carbon unsaturated bond include carbon-carbon unsaturated bonds other than an aromatic carbon-carbon unsaturated bond (i.e., aliphatic carbon-carbon double bond or triple bond). The term "crosslinkable carbon-carbon unsaturated bond" used herein normally refers to an aliphatic carbon-carbon double bond. When the cycloolefin monomer includes a crosslinkable carbon-carbon unsaturated bond, the position of the crosslinkable carbon-carbon unsaturated bond in the cycloolefin monomer is not particularly limited. The crosslinkable carbon-carbon unsaturated bond may be present at an arbitrary position (e.g., at the end of a side chain or within a side chain) other than the alicyclic structure formed by carbon atoms. For example, the aliphatic carbon-carbon double bond may be present as a vinyl group ($CH_2=CH-$), a vinylidene group ($CH_2=C<$), or a vinylene group ($-CH=CH-$). It is preferable that the aliphatic carbon-carbon double bond be present as a vinyl group and/or a vinylidene group, and more preferably a vinylidene group, due to excellent radical crosslinkability.

A norbornene-based monomer that includes at least one crosslinkable carbon-carbon unsaturated bond is preferable as the cycloolefin monomer that includes at least one crosslinkable carbon-carbon unsaturated bond. Note that the term "norbornene-based monomer" used herein refers to a cycloolefin monomer that includes a norbornene ring structure in the molecule. Examples of the norbornene-based monomer include norbornenes, dicyclopentadienes, tetracyclododecenes, and the like.

Examples of the cycloolefin monomer that includes at least one crosslinkable carbon-carbon unsaturated bond include monocyclic cycloolefin monomers such as 3-vinylcyclohexene, 4-vinylcyclohexene, 1,3-cyclopentadiene, 1,3-cyclohexadiene, 1,4-cyclohexadiene, 5-ethyl-1,3-cyclohexadiene, 1,3-cycloheptadiene, and 1,3-cyclooctadiene; norbornene-based monomers such as 5-ethylidene-2-norbornene, 5-methylidene-2-norbornene, 5-isopropylidene-2-norbornene, 5-vinylnorbornene, 5-allylnorbornene, 5,6-diethylidene-2-norbornene, dicyclopentadiene, a cyclopentadiene-methylcyclopentadiene codimer, 2,5-norbornadiene, 2-ethylidene-1,4,5,8-dimethano-1,2,3,4,4a,5,8,8a-octahydronaphthalene, and a cyclopentadiene trimer; and the like. Among these, it is preferable to use a norbornene-based monomer that includes at least one crosslinkable carbon-carbon unsaturated bond.

Examples of the cycloolefin monomer that does not include a crosslinkable carbon-carbon unsaturated bond include monocyclic cycloolefin monomers such as cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexene, 3,4-dimethylcyclohexene, 3-chlorocyclohexene, cycloheptene; norbornene-based monomers such as norbornene, 5-methylnorbornene, 5-ethylnorbornene, 5-propylnorbornene, 5,6-dimethylnorbornene, 1-methylnorbornene, 7-methylnorbornene, 5,5,6-trimethyl-norbornene, 5-phenylnorbornene, tetracyclododecene, 1,4,5,8-dimethano-1,2,3,4,4a,5,8,8a-octahydronaphthalene, 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2,3-dimethyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-ethylidene-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene, 1,5-dimethyl-1,4,5,8-dimethano-1,2,3,4,4a,5,8,8a-octahydronaphthalene, 2-cyclohexyl-1,4,5,8-dimethano-1,2,3,4,4a,5,8,8a-octahydronaphthalene, 2,3-dichloro-1,4,5,8-dimethano-1,2,3,4,4a,5,8,8a-octahydronaphthalene, 2-isobutyl-1,4,5,8-dimethano-1,2,3,4,4a,5,8,8a-octahydronaphthalene, 1,2-dihydrodicyclopentadiene, 5-chloronorbornene, 5,5-dichloronorbornene, 5-fluoronorbornene, 5,5,6-trifluoro-6-trifluoromethylnorbornene, 5-chloromethylnorbornene, 5-methoxynorbornene, 5,6-dicarboxylnorbornene anhydrate, 5-dimethylaminonorbornene, and 5-cyanonorbornene; and the like. Among these, it is preferable to use a norbornene-based monomer that does not include a crosslinkable carbon-carbon unsaturated bond.

These cycloolefin monomers may be used either alone or in combination. For example, a mixture of a cycloolefin monomer that includes at least one crosslinkable carbon-carbon unsaturated bond and a cycloolefin monomer that does not include a crosslinkable carbon-carbon unsaturated bond may be used as the cycloolefin monomer.

The ratio of the cycloolefin monomer that includes at least one crosslinkable carbon-carbon unsaturated bond to the cycloolefin monomer that does not include a crosslinkable carbon-carbon unsaturated bond used for the polymerizable composition according to one embodiment of the invention may be appropriately selected. The weight ratio (cycloolefin monomer that includes at least one crosslinkable carbon-carbon unsaturated bond/cycloolefin monomer that does not include a crosslinkable carbon-carbon unsaturated bond) of the cycloolefin monomer that includes at least one crosslinkable carbon-carbon unsaturated bond to the cycloolefin monomer that does not include a crosslinkable carbon-carbon unsaturated bond is normally 5/95 to 100/0, preferably 10/90 to 100/0, and more preferably 15/85 to 100/0. If the ratio is within the above range, the heat resistance and the mechanical strength of the resulting crosslinked resin formed article and laminate are improved in a well-balanced manner.

The polymerizable composition according to one embodiment of the invention may include an optional monomer that is copolymerizable with the cycloolefin monomer as long as the advantageous effects of the invention are not impaired.

Examples of the optional monomer include a (meth)acrylate monomer, a styrene monomer, a vinyl ester monomer, and the like. The optional monomer may be a crosslinkable monomer.

The optional monomer is normally used in an amount of 0.1 to 100 parts by weight, and preferably 1 to 50 parts by weight, based on 100 parts by weight of the cycloolefin monomer.

Coupling Agent (A)

The coupling agent (A) used for the polymerizable composition according to one embodiment of the invention is not particularly limited as long as the coupling agent (A) has a cycloolefin structure. Examples of the coupling agent (A) include a compound represented by the following formula (2).

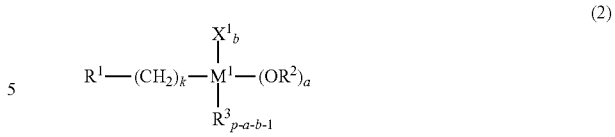

wherein $M^1$ is Si, Ti, Al, or Zr (preferably Si),
$R^1$ is a substituent having a cycloolefin structure,
$R^2$ and $R^3$ are independently an alkyl group or an acyl group that includes 1 to 3 carbon atoms and optionally includes an ether group (—O—) or an ester group (—O—C(=O)— or —C(=O)—O—),
$X^1$ is a halogen atom,
k is an integer from 2 to 10, p is the valence of $M^1$, and a and b are independently an integer from 0 to (m−1), provided that a+b≤m−1.

The cycloolefin structure of $R^1$ is an alicyclic structure that includes a carbon-carbon double bond. Examples of the alicyclic structure include a monocyclic ring, a polycyclic ring, a fused polycyclic ring, a bridged ring, a combination thereof, and the like. The position of the carbon-carbon double bond in the alicyclic structure is not particularly limited.

The substituent having a cycloolefin structure represented by $R^1$ is preferably a substituent having a norbornene structure, and more preferably a substituent represented by the following formula (3).

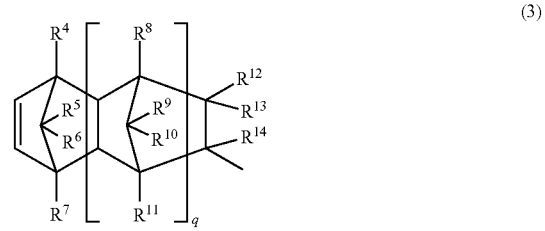

wherein $R^4$ to $R^{14}$ are independently a hydrogen atom, a halogen atom, a functional group that includes a halogen atom, an oxygen atom, a nitrogen atom, a sulfur atom, or a silicon atom, or a hydrocarbon group having 1 to 20 carbon atoms that optionally includes a halogen atom or the functional group, provided that $R^{12}$ to $R^{14}$ optionally bond to each other to form a ring, and q is 0 or a positive integer (preferably 10 or less).

Examples of the halogen atom include a fluorine atom, a chlorine atom, a bromine atom, and the like.

Examples of the functional group that includes a halogen atom include a trifluoromethyl group, a pentafluoroethyl group, a perfluorobutyl group, and the like.

Examples of the functional group that includes an oxygen atom include a hydroxyl group, an alkoxy group, an aryloxy group, a carbonyl group, a hydroxycarbonyl group, an alkoxycarbonyl group, an aryloxycarbonyl group, an acid anhydride group, and the like.

Examples of the functional group that includes a nitrogen atom include an amino group, an alkylamino group, a dialkylamino group, an arylamino group, a cyano group, and the like.

Examples of the functional group that includes an oxygen atom and a nitrogen atom include an aminocarbonyl group, an alkylaminocarbonyl group, an arylaminocarbonyl group, and the like.

Examples of the functional group that includes a sulfur atom include a mercapto group, an alkylthio group, an arylthio group, and the like.

Examples of the functional group that includes a silicon atom include a silyl group, an alkylsilyl group, an arylsilyl group, and the like.

Examples of the functional group that includes an oxygen atom and a silicon atom include an alkoxysilyl group, an aryloxysilyl group, and the like.

Specific examples of a preferable substituent represented by the formula (3) include a bicycloheptenyl group (norbornenyl group), a dicyclopentadienyl group, a tetracyclododecenyl group, a tricyclopentadienyl group, and the like.

Examples of the groups represented by $R^2$ and $R^3$ in the formula (2) include a methyl group, an ethyl group, a propyl group, an acetyl group, and the like.

Examples of the halogen atom represented by $X^1$ include a fluorine atom, a chlorine atom, a bromine atom, and the like.

k in the formula (2) is an integer from 2 to 10, and preferably an integer from 2 to 6. When using the polymerizable composition that includes the compound represented by the formula (2) wherein k is too small as the coupling agent (A), a resin formed article in which the filler and the cycloolefin polymer exhibit inferior adhesion may be obtained. When using the polymerizable composition that includes the compound represented by the formula (2) wherein k is too large, a helical structure may be easily formed, and a resin formed article in which the filler and the cycloolefin polymer exhibit inferior adhesion may be obtained.

a and b in the formula (2) are independently an integer from 0 to (p−1), provided that a+b≤p−1. The value "a+b" is preferably an integer from 1 to (p−1), and more preferably an integer from 2 to (p−1).

Specific examples of the compound represented by the formula (2) include the compounds represented by the formula (2) wherein p=4, a=3, and b=0, such as 2-(2-norbornyl)ethyltrimethoxysilane, 2-(2-norbornyl)ethyltriethoxysilane, 3-(2-norbornyl)propyltrimethoxysilane, 3-(2-norbornyl)propyltriethoxysilane, 4-(2-norbornyl)butyltrimethoxysilane, 4-(2-norbornyl)butyltriethoxysilane, 6-(2-norbornyl)hexyltrimethoxysilane, and 6-(2-norbornyl)hexyltriethoxysilane; the compounds represented by the formula (2) wherein p=4, a=2, and b=0, such as 2-(2-norbornyl)ethylmethyldimethoxysilane, 2-(2-norbornyl)ethylmethyldiethoxysilane, 3-(2-norbornyl)propylmethyldimethoxysilane, 3-(2-norbornyl)propylmethyldimethoxysilane, 3-(2-norbornyl)butylmethyldiethoxysilane, 6-(2-norbornyl)hexylmethyldimethoxysilane, and 6-(2-norbornyl)hexylmethyldiethoxysilane; the compounds represented by the formula (2) wherein p=4, a=0, and b=3, such as 2-(2-norbornyl)ethyltrichlorosilane, 2-(2-norbornyl)ethyltribromosilane, 3-(2-norbornyl)propyltrichlorosilane, and 3-(2-norbornyl)propyltribromosilane; and the like.

Among these, the compounds represented by the formula (2) wherein p=4, a=3, and b=0 are preferable since the effects are further improved.

These coupling agents (A) may be used either alone or in combination.

The coupling agent (A) is normally used in an amount of 0.01 to 10 parts by weight, and preferably 0.1 to 5 parts by weight, based on 100 parts by weight of the filler.

Coupling Agent (B)

The coupling agent (B) used for the polymerizable composition according to one embodiment of the invention includes at least one compound represented by the formula (1): $(X)_{n-m}$-M-$(Y)_m$.

The coupling agent (B) excludes the coupling agent (A).

In the formula (1), m is an integer from 1 to 3, and n is the valence of M.

(n−m) is 1, 2, or 3, and preferably 2 or 3.

X is a hydrolyzable group such as an alkoxy group having 1 to 10 carbon atoms (e.g., methoxy group or ethoxy group), an acetoxy group, or amino group. X is preferably an alkoxy group having 1 to 10 carbon atoms.

When (n−m) is an integer equal to or larger than 2, X may be either identical or different.

Y is a hydrocarbon group having 1 to 50 carbon atoms that is unsubstituted or substituted with a substituent that includes an oxygen atom, a nitrogen atom, a sulfur atom, a halogen atom, or a silicon atom, and preferably a hydrocarbon group having 1 to 30 carbon atoms that is unsubstituted or substituted with a substituent that includes an oxygen atom, a nitrogen atom, a sulfur atom, a halogen atom, or a silicon atom.

Examples of the substituent that includes an oxygen atom, a nitrogen atom, a sulfur atom, a halogen atom, or a silicon atom include, but are not limited to, a hydroxyl group, an alkoxy group, an epoxy group, an ester group, a carboxyl group, an amino group, a mono-substituted amino group, a di-substituted amino group, a mercapto group, an alkylthio group, a chlorine atom, a fluorine atom, and a trimethylsilyl group.

When m is an integer equal to or larger than 2, Y may be either identical or different.

Note that at least one Y is a group having a solubility parameter value (SP value) of 7.5 to 10. If the solubility parameter value (SP value) is less than 7.5, a deterioration in reactivity and heat resistance may occur. If the solubility parameter value (SP value) exceeds 10, the polymerization reaction may not proceed sufficiently.

The SP value is calculated using the calculation method reported by Fedors. The unit for the SP value is $(cal/cm^3)^{1/2}$. The details of the SP value calculation method are described in R. T. Fedors, Polymer Engineering and Science, 14, 147 (1974).

Examples of the group represented by Y that has an SP value of 7.5 to 10 include a β-(3,4-epoxycyclohexyl)ethyl group (9.38), a γ-glycidoxypropyl group (9.29), a γ-methacryloxypropyl group (9.48), a γ-mercaptopropyl group (9.57), a γ-aminopropyl group (9.86), a phenyl group (9.98), an n-hexadecyl group (7.85), a cyclohexyl group (9.19), an n-decyl group (8.10), and the like. Note that each value in the parenthesis is the SP value.

It is preferable that the group represented by Y not include an active hydrogen group. A resin formed article that exhibits excellent heat resistance can be obtained by utilizing the coupling agent (B) wherein Y does not include an active hydrogen group.

Note that the term "active hydrogen group" used herein refers to a group that includes a hydrogen atom that is bonded to an atom other than a carbon atom. Examples of the active hydrogen group include a hydroxyl group, an amino group, a carboxyl group, and a mercapto group.

Examples of the coupling agent (B) include a silane coupling agent, a titanate coupling agent, an aluminate coupling agent, a zirconate coupling agent, and the like that include the compound represented by the formula (1). Among these, a silane coupling agent is preferable.

Examples of the silane coupling agent include γ-aminopropyltrimethoxysilane, γ-aminopropyltriethoxysilane, γ-dibutylaminopropyltrimethoxysilane, γ-dibutylaminopropyltriethoxysilane, γ-glycidoxypropyltrimethoxysilane, γ-glycidoxypropylmethyldimethoxysilane, γ-glycidoxypropyltriethoxysilane, γ-glycidoxypropylmethyldiethoxysilane, β-(3,4-epoxycyclohexyl)ethyltrimethoxysilane, β-(3,4-epoxycyclohexyl)ethyltriethoxysilane, γ-methacryloxypropyltrimethoxysilane, γ-methacryloxypropylmethyldimethoxysilane, γ-methacryloxypropyltriethoxysilane, γ-methacryloxypropylmethyldiethoxysilane, γ-mercaptopropyltrimethoxysilane, γ-mercaptopropylmethyldimethoxysilane, cyclohexyltrimethoxysilane, phenyltrimethoxysilane, diphenyldimethoxysilane, n-decyltrimethoxysilane, n-hexadecyltrimethoxysilane, 1,6-bis(trimethoxysilyl)hexane, trimethoxystyrylsilane, and the like.

Among these, γ-methacryloxpropyltrimethoxysilane, cyclohexyltrimethoxysilane, phenyltrimethoxysilane, diphenyldimethoxysilane, n-decyltrimethoxysilane, n-hexadecyltrimethoxysilane, and the like are preferable since the mutual solubility of the resin and the filler can be improved, and the viscosity of the mixture can be reduced.

These coupling agents (B) may be used either alone or in combination.

The coupling agent (B) is normally used in an amount of 0.01 to 10 parts by weight, and preferably 0.1 to 5 parts by weight, based on 100 parts by weight of the filler.

The weight ratio (coupling agent (A)/coupling agent (B)) of the coupling agent (A) to the coupling agent (B) is preferably 0.1 to 1.5, and more preferably 0.3 to 1.3. If the weight ratio of the coupling agent (A) to the coupling agent (B) is less than 0.1, a resin formed article may be obtained in which the filler and the cycloolefin polymer exhibit insufficient adhesion, and which exhibits insufficient impact resistance. If the weight ratio of the coupling agent (A) to the coupling agent (B) exceeds 1.5, a resin formed article that exhibits insufficient heat resistance may be obtained.

The coupling agent (A) and the coupling agent (B) are normally used in a total amount of 0.01 to 10 parts by weight, and preferably 0.1 to 10 parts by weight, based on 100 parts by weight of the filler.

Filler

Examples of the filler used for the polymerizable composition according to one embodiment of the invention include an inorganic filler and an organic filler. It is preferable to use an inorganic filler from the viewpoint of the application of the resin formed article.

Examples of the inorganic filler include inorganic oxides such as silica, alumina, magnesium oxide, beryllium oxide, iron oxide, zinc oxide, tin oxide, barium ferrite, and strontium ferrite; inorganic hydroxides such as aluminum hydroxide, magnesium hydroxide, and calcium hydroxide; inorganic nitrides such as aluminum nitride, boron nitride, and silicon nitride; inorganic carbides such as silicon carbide; inorganic carbonates such as calcium carbonate, magnesium carbonate, and sodium hydrogen carbonate; inorganic sulfates such as calcium sulfate; inorganic silicates such as talc, clay, mica, kaolin, fly ash, montmorillonite, calcium silicate, glass, and glass balloon; metals such as copper, silver, iron, aluminum, nickel, and titanium; carbon-based compounds such as diamond, carbon fiber, and carbon black; and the like.

Examples of the organic filler include wood flour, starch, organic pigments, polystyrene, nylon, polyolefins such as polyethylene and polypropylene, vinyl chloride, particulate compounds such as waste plastic, and the like.

The surface of the filler may be hydrophobized in advance. The surface of the filler may be hydrophobized using a known method. For example, the surface of the filler may be hydrophobized by a dry process, a wet process, an integral blending method, or the like using a known coupling agent, or the coupling agent (A) or (B) that can provide hydrophobicity.

The particle size (average particle size) of the filler may be appropriately selected. The average value of the length in the longitudinal direction and the length in the lateral direction when the particles are observed three-dimensionally is normally 0.01 to 200 μm, preferably 0.1 to 100 μm, and more preferably 0.5 to 50 μm. The expression "observed three-dimensionally" used herein means that the three-dimensional shape of the entire particles is observed while rotating the stage of an electron microscope (SEM), for example.

The above fillers may be used either alone or in combination.

The filler is normally used in an amount of 0.1 to 1000 parts by weight, and preferably 50 to 300 parts by weight, based on 100 parts by weight of the cycloolefin monomer.

Metathesis Polymerization Catalyst

The metathesis polymerization catalyst used for the polymerizable composition according to one embodiment of the invention is not particularly limited as long as the metathesis polymerization catalyst functions as a catalyst for the ring-opening metathesis polymerization reaction of the cycloolefin monomer.

Examples of the metathesis polymerization catalyst include a complex that includes a transition metal atom and a ligand.

Examples of the transition metal atom included in the complex include the Group 5, 6, or 8 elements (atoms) in the periodic table (i.e., the long form of the periodic table (hereinafter the same)). Examples of the Group 5 elements (atoms) include tantalum and the like. Examples of the Group 6 elements (atoms) include molybdenum, tungsten, and the like. Examples of the Group 8 elements (atoms) include ruthenium, osmium, and the like. Among these, the Group 8 elements (atoms) such as ruthenium and osmium are preferable, and ruthenium is more preferable.

The ligand included in the complex is not particularly limited as long as the ligand is an ion, an atom, a compound, or the like that has a coordinating ability. It is preferable that the ligand be a carbene compound. The term "carbene compound" is the generic name of compounds that include a free methylene group, and refers to a compound that includes a divalent carbon atom (carbene carbon) that does not have a charge represented by ">C:"

A complex that includes ruthenium as the transition metal atom, and includes at least a carbene compound as the ligand (hereinafter referred to as "ruthenium carbene complex") exhibits excellent catalytic activity during bulk polymerization. A high-quality resin formed article can be produced with high productivity by utilizing the ruthenium carbene complex as the metathesis catalyst. Moreover, since the amount of unreacted monomers remaining in the resin formed article is reduced, a bad smell and the like do not occur.

Since the ruthenium carbene complex exhibits excellent stability to oxygen and water in air, the ruthenium carbene complex is not easily inactivated even if the ruthenium carbene complex is used under an inert atmosphere. Therefore, metathesis polymerization can be more easily effected by utilizing the ruthenium carbene complex.

Examples of the ruthenium carbene complex include compounds respectively represented by the following formulas (4) and (5).

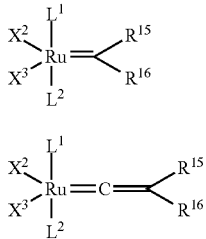

(4)

(5)

wherein $R^{15}$ and $R^{16}$ are independently a hydrogen atom, a halogen atom, or a hydrocarbon group having 1 to 20 carbon atoms that optionally includes a halogen atom, an oxygen atom, a nitrogen atom, a sulfur atom, a phosphorus atom, or a silicon atom, $X^2$ and $X^3$ are independently an anionic ligand, and $L^1$ and $L^2$ are independently a heteroatom-containing carbene compound or a neutral electron donor compound other than the heteroatom-containing carbene compound, provided that $R^{15}$ and $R^{16}$ are optionally bonded to each other to form a ring, and $R^{15}$, $R^{16}$, $X^2$, $X^3$, $L^1$, and $L^2$ are optionally bonded in an arbitrary combination to form a multidentate chelated ligand.

The anionic ligand represented by $X^2$ and $X^3$ is a ligand that is negatively charged when separated from the center metal atom. Examples of the anionic ligand include a halogen atom, a diketonate group, a substituted cyclopentadienyl group, an alkoxy group, an aryloxy group, a carboxyl group, and the like. Among these, a halogen atom is preferable, and a chlorine atom is more preferable.

The heteroatom included in the heteroatom-containing carbene compound represented by $L^1$ and $L^2$ is a Group 15 or 16 element (atom) in the periodic table. Examples of such an atom include N, O, P, S, As, Se, and the like. Among these, N, O, P, S, and the like are preferable, and N is particularly preferable since a stable carbene compound can be obtained.

Examples of the heteroatom-containing carbene compound include compounds respectively represented by the following formulas (6) and (7),

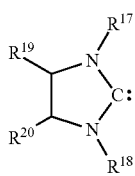

(6)

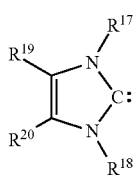

(7)

wherein $R^{17}$ to $R^{20}$ are independently a hydrogen atom, a halogen atom, or a hydrocarbon group having 1 to 20 carbon atoms that optionally includes a halogen atom, an oxygen atom, a nitrogen atom, a sulfur atom, a phosphorus atom, or a silicon atom, provided that $R^{17}$ to $R^{20}$ are optionally bonded to each other to form a ring.

Specific examples of the heteroatom-containing carbene compound include
1,3-di(1-adamantyl)imidazolidin-2-ylidene,
1,3-dimesityloctahydrobenzimidazol-2-ylidene,
1,3-di(1-phenylethyl)-4-imidazolin-2-ylidene,
1,3,4-triphenyl-2,3,4,5-tetrahydro-1H-1,2,4-triazol-5-ylidene,
1,3-dicyclohexylhexahydropyrimidin-2-ylidene,
N,N,N',N'-tetraisopropylformamidinylidene, (1,3-dimesityl-imidazolidin-2-ylidene),
1,3-dimesitylimidazolidin-2-ylidene, 1,3-dicyclohexylimidazolidin-2-ylidene,
1,3-diisopropyl-4-imidazolin-2-ylidene,
1,3-dimesityl-2,3-dihydrobenzimidazol-2-ylidene, and the like.

The neutral electron donor compound other than the heteroatom-containing carbene compound represented by $L^1$ and $L^2$ is an electron donor compound that is neutrally charged when separated from the center metal (provided that the heteroatom-containing carbene compound is excluded). Examples of the neutral electron donor compound include phosphines, ethers, pyridines, and the like. Among these, trialkylphosphines are preferable.

Examples of the ruthenium carbene complex represented by the formula (4) or (5) include
benzylidene(1,3-dimesitylimidazolydin-2-ylidene)(tricyclohexylphosphine)ruthenium dichloride, (1,3-dimesitylimidazolydin-2-ylidene)(3-methyl-2-buten-1-ylidene) (tricyclopentylphosphine)ruthenium dichloride,
benzylidene(1,3-dimesityloctahydrobenzimidazol-2-ylidene)(tricyclohexylphosphine) ruthenium dichloride,
benzylidene[1,3-di(1-phenylethyl)-4-imidazolin-2-ylidene](tricyclohexylphosphine) ruthenium dichloride,
benzylidene(1,3-dimesityl-2,3-dihydrobenzimidazol-2-ylidene)(tricyclohexylphosphine) ruthenium dichloride,
benzylidene(tricyclohexylphosphine)(1,3,4-triphenyl-2,3,4,5-tetrahydro-1H-1,2,4-triazol-5-ylidene)ruthenium dichloride,
(1,3-diisopropylhexahydropyrimidin-2-ylidene)(ethoxymethylene) (tricyclohexylphosphine)ruthenium dichloride,
benzylidene(1,3-dimesitylimidazolydin-2-ylidene)pyridineruthenium dichloride, and the like.

The metathesis polymerization catalyst is normally used in an amount of 0.01 mmol or more, preferably 0.1 to 50 mmol, and more preferably 0.1 to 20 mmol, based on 1 mol of the cycloolefin monomer. If the amount of the metathesis polymerization catalyst is too small, the production efficiency may deteriorate. If the amount of the metathesis polymerization catalyst is too large, an intense polymerization reaction may occur, and curing may occur in an insufficiently formed state, or the catalyst may precipitate. Moreover, the storage stability of the polymerizable composition tends to deteriorate.

Additional Component

The polymerizable composition according to one embodiment of the invention may include a dispersant. When the polymerizable composition includes the dispersant, the components of the polymerizable composition are homogenously dispersed, and a more homogenous resin formed article can be obtained.

Examples of the dispersant include a cationic dispersant, an anionic dispersant, a betaine-based dispersant, a nonionic dispersant, and the like. Among these, the nonionic dispersant is particularly preferable.

The nonionic dispersant refers to a compound that includes one or more hydrophobic groups and one or more hydrophilic groups in the molecule. Examples of the hydrophobic group include a hydrocarbon group that may include a fluorine atom and a silicon atom, and a long-chain polypropylene oxide group. Examples of the hydrophilic group include groups that include a polar group (e.g., hydroxyl group, ester group, phosphoric ester group, ether group, ether ester group, amide group, amino group, amine oxide group, imide group, or sulfoxide group), and are not ionized in water.

These dispersants may be used either alone or in combination.

The dispersant is normally used in an amount of 0.1 to 50 parts by weight, preferably 0.1 to 20 parts by weight, more preferably 0.1 to 10 parts by weight, and particularly preferably 0.1 to 5 parts by weight, based on 100 parts by weight of the cycloolefin monomer.

The polymerizable composition according to one embodiment of the invention may include an aging preventive. When the polymerizable composition includes the aging preventive, a resin formed article that exhibits more excellent heat resistance can be obtained.

Examples of the aging preventive include a phenol-based aging preventive, an amine-based aging preventive, a phosphorus-based aging preventive, a sulfur-based aging preventive, and the like. Among these, a phenol-based aging preventive and an amine-based aging preventive are preferable, and a phenol-based aging preventive is more preferable.

These aging preventives may be used either alone or in combination.

The aging preventive is normally used in an amount of 0.0001 to 30 parts by weight, preferably 0.001 to 15 parts by weight, and more preferably 0.01 to 5 parts by weight, based on 100 parts by weight of the cycloolefin monomer.

The polymerizable composition according to one embodiment of the invention may include a crosslinking agent. When the polymerizable composition includes a crosslinkable cycloolefin monomer, a crosslinkable resin formed article or a crosslinked resin formed article can be easily obtained by adding the crosslinking agent to the polymerizable composition.

The crosslinking agent is not particularly limited as long as the crosslinking agent can induce a crosslinking reaction. A radical generator such as an organic peroxide, a diazo compound, or a nonpolar radical generator is normally used as the crosslinking agent.

Examples of the organic peroxide include hydroperoxides such as t-butyl hydroperoxide, p-menthane hydroperoxide, and cumene hydroperoxide; dialkyl peroxides such as dicumyl peroxide, t-butylcumyl peroxide, α,α'-bis(t-butylperoxy-m-isopropyl)benzene, di-t-butyl peroxide, 2,5-dimethyl-2,5-di(t-butylperoxy)-3-hexin, and 2,5-dimethyl-2,5-di(t-butylperoxy)hexane; diacyl peroxides such as dipropionyl peroxide and benzoyl peroxide; peroxy ketals such as 2,2-di(t-butylperoxy) butane, 1,1-di(t-hexylperoxy)cyclohexane, 1,1-di(t-butylperoxy)-2-methylcyclohexane, and 1,1-di(t-butylperoxy)cyclohexane; peroxy esters such as t-butylperoxy acetate and t-butylperoxy benzoate; peroxy carbonates such as t-butylperoxyisopropyl carbonate and di(isopropylperoxy)dicaronate; alkylsilyl peroxides such as t-butyltrimethylsilyl peroxide; cyclic peroxides such as 3,3,5,7,7-pentamethyl-1,2,4-trioxepane, 3,6,9-triethyl-3,6,9-trimethyl-1,4,7-triperoxonane; 3,6-diethyl-3,6-dimethyl-1,2,4,5-tetraoxane; and the like.

Among these, dialkyl peroxides, peroxy ketals, and cyclic peroxides are preferable since the metathesis polymerization reaction is not hindered (or hindered to only a small extent).

Examples of the diazo compound include 4,4'-bisazidobenzal(4-methyl)cyclohexanone, 2,6-bis(4'-azidobenzal)cyclohexanone, and the like.

Examples of the nonpolar radical generator include 2,3-dimethyl-2,3-diphenylbutane, 3,4-dimethyl-3,4-diphenylhexane, 1,1,2-triphenylethane, 1,1,1-triphenyl-2-phenylethane, and the like.

The one-minute half-life temperature of the radical generator is appropriately selected depending on the crosslinking reaction conditions, but is normally 100 to 300° C., preferably 120 to 250° C., and more preferably 150 to 230° C. The term "one-minute half-life temperature" used herein refers to a temperature at which half of the radical generator is decomposed within 1 minute. The one-minute half-life temperature of the radical generator may be determined referring to the catalog or the website of the manufacturer of each radical generator (e.g., NOF Corporation).

The above crosslinking agents may be used either alone or in combination.

The crosslinking agent is normally used in an amount of 0.01 to 10 parts by weight, preferably 0.1 to 10 parts by weight, and more preferably 0.5 to 5 parts by weight, based on 100 parts by weight of the cycloolefin monomer.

The polymerizable composition according to one embodiment of the invention may include an inert solvent.

Examples of the inert solvent include linear aliphatic hydrocarbons such as n-pentane, n-hexane, n-heptane, liquid paraffin, and mineral spirit; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, dicycloheptane, tricyclodecane, hexahydroindene, and cyclooctane; aromatic hydrocarbons such as benzene, toluene, and xylene; hydrocarbons that include an alicyclic ring and an aromatic ring such as indene and tetrahydronaphthalene; nitrogen-containing hydrocarbons such as nitromethane, nitrobenzene, and acetonitrile; ethers such as diethyl ether and tetrahydrofuran; and the like. Among these, aromatic hydrocarbons, aliphatic hydrocarbons, alicyclic hydrocarbons, and hydrocarbons that include an alicyclic ring and an aromatic ring are preferable.

The above inert solvents may be used either alone or in combination.

The polymerizable composition according to one embodiment of the invention may include a modifier. The modifier is added to control the polymerization activity, and improve the polymerization reaction rate.

Examples of the modifier include a trialkoxyaluminum, a triphenoxyaluminum, a dialkoxyalkylaluminum, an alkoxydialkylaluminum, a trialkylaluminum, a dialkoxyaluminum chloride, an alkoxyalkylaluminum chloride, a dialkylaluminum chloride, a trialkoxyscandium, a tetraalkoxytitanium, a tetraalkoxytin, a tetraalkoxyzirconium, and the like.

The above modifiers may be used either alone or in combination.

The modifier is used so that the molar ratio of the metal atoms included in the metathesis polymerization catalyst to the modifier is 1:0.05 to 1:100, preferably 1:0.2 to 1:20, and more preferably 1:0.5 to 1:10.

The polymerizable composition according to one embodiment of the invention may include a polymerization reaction retardant. The polymerization reaction retardant suppresses an increase in viscosity that may occur during the polymerization reaction of the polymerizable composition according to one embodiment of the invention.

Examples of the polymerization reaction retardant include phosphine compounds such as triphenylphosphine, tributylphosphine, trimethylphosphine, triethylphosphine, dicyclohexylphosphine, vinyldiphenylphosphine, allyldiphenylphosphine, triallylphosphine, and styryldiphenylphosphine; Lewis bases such as aniline and pyridine; and the like.

The amount of the polymerization reaction retardant may be appropriately adjusted.

The polymerizable composition according to one embodiment of the invention may include an additional known additive. Examples of the additional known additive include a chain transfer agent, a light stabilizer, an antifoaming agent, a blowing agent, and the like.

Polymerizable Composition

The polymerizable composition according to one embodiment of the invention utilizes the synergistic effect of the coupling agents (A) and (B) (i.e., the effect of the coupling agents (A) and (B) on the filler is synergistically improved, and a resin formed article that exhibits excellent heat resistance and impact resistance is obtained). The coupling agents (A) and (B) are not used as a pretreatment agent for the filler, but are used as the components of the composition. A resin formed article in which the cycloolefin polymer and the filler exhibit excellent adhesion to each other, and which exhibits excellent heat resistance and impact resistance can be obtained by utilizing the polymerizable composition according to one embodiment of the invention that has the above features.

The polymerizable composition may be divided into a first pack and a second pack to prepare a two-pack polymerizable composition. A polymerizable composition that exhibits excellent storage stability can be obtained by preparing a two-pack polymerizable composition, and the desired resin formed article can be more efficiently obtained.

It is preferable that the first pack of the two-pack polymerizable composition include the cycloolefin monomer, the coupling agent (A), the coupling agent (B), and the filler, and the second pack of the two-pack polymerizable composition include the metathesis polymerization catalyst.

It is preferable to prepare the first pack by mixing the cycloolefin monomer, the coupling agent (A), the coupling agent (B), and the filler, and allowing the resulting mixture to stand at −10 to +100° C. (preferably 0 to 50° C.) for at least 4 hours The advantageous effect of the invention (i.e., that the effect of the coupling agents (A) and (B) on the filler is synergistically improved, and a resin formed article that exhibits excellent heat resistance and impact resistance is obtained) can be achieved by preparing the first pack using the above method.

2) Resin Formed Article

A resin formed article according to one embodiment of the invention is a resin formed article obtained by subjecting the polymerizable composition according to one embodiment of the invention to bulk polymerization, or a resin formed article obtained by subjecting a mixture of the first pack and the second pack included in the two-pack polymerizable composition to bulk polymerization. The resin formed article according to one embodiment of the invention exhibits excellent heat resistance and impact resistance.

When the polymerizable composition according to one embodiment of the invention includes a cycloolefin monomer that includes a crosslinkable carbon-carbon unsaturated bond as the monomer component, a crosslinkable resin formed article can be easily obtained using the composition. When the resulting crosslinkable resin formed article is heated, a crosslinking reaction proceeds while the crosslinkable resin formed article is melted to obtain a crosslinked resin formed article.

Since the melted crosslinkable resin formed article has high viscosity, the overall shape of the melted crosslinkable resin formed article is easily maintained. Therefore, when the crosslinkable resin formed article is brought into contact with an arbitrary member while heating the crosslinkable resin formed article, the crosslinkable resin formed article exhibits excellent followability to the member at the contact surface with the member while maintaining its overall shape, and is cured through a crosslinking reaction. A laminate that exhibits excellent interlayer adhesion can be obtained by utilizing the above characteristics of the crosslinkable resin formed article.

The crosslinkable resin formed article may suitably be used as a prepreg when producing a crosslinked resin formed article or a laminate, for example.

The crosslinkable resin formed article may include a crosslinked part. For example, when subjecting the polymerizable composition to bulk polymerization in a mold, the temperature may increase, and a crosslinking reaction may proceed in the center area of the mold. The crosslinkable resin formed article sufficiently exhibits the desired effects as long as the surface part of the resin formed article is not crosslinked.

The resin formed article according to one embodiment of the invention can be dissolved in an organic solvent such as toluene or tetrahydrofuran in a state in which the resin formed article substantially does not have a crosslinked structure.

The polystyrene-reduced weight average molecular weight of the resin formed article determined by gel permeation chromatography (eluant: tetrahydrofuran) is normally 1000 to 1,000,000, preferably 5000 to 500,000, and more preferably 10,000 to 100,000.

The resin formed article according to one embodiment of the invention may be a crosslinked resin formed article. The crosslinked resin formed article is obtained by subjecting the polymerizable composition to bulk polymerization and crosslinking. The details of the crosslinked resin formed article production method are described later.

3) Method for Producing Resin Formed Article (1) Method for Producing Resin Formed Article The resin formed article according to one embodiment of the invention may be obtained by (a) a method that applies the polymerizable composition to a support, and subjects the polymerizable composition to bulk polymerization, or (b) a method that injects the polymerizable composition into a mold, and subjects the polymerizable composition to bulk polymerization, for example.

The support used for the method (a) is not particularly limited. Examples of the support include a metal foil, a resin film, and a metal or resin sheet.

Examples of a material for forming the metal foil or the metal sheet include iron, stainless steel, copper, aluminum, nickel, chromium, gold, silver, and the like.

Examples of a material for forming the resin film or the resin sheet include polyethylene terephthalate, polypropylene, polyethylene, polycarbonate, polyethylene naphthalate, a polyacrylate, nylon, and the like.

The surface of the support may be plated with silver, copper, nickel, or the like.

When using the metal foil or the resin film as the support, the thickness of the metal foil or the resin film is preferably 1 to 150 μm, more preferably 2 to 100 μm, and still more preferably 3 to 75 μm, from the viewpoint of workability and the like. It is preferable that the surface of the support be flat and smooth.

When using the metal sheet or the resin sheet as the support, the thickness of the metal sheet or the resin sheet is preferably 50 µm to 5 mm, more preferably 100 µm to 3 mm, and still more preferably 200 µm to 2 mm, from the viewpoint of strength. The metal sheet or the resin sheet may be stamped to have the desired shape, for example.

The polymerizable composition may be applied to the support using an arbitrary method. For example, the polymerizable composition may be applied to the support using a spray coating method, a dip coating method, a roll coating method, a curtain coating method, a die coating method, a slit coating method, or the like.

After applying the polymerizable composition to the support, the polymerizable composition is heated and subjected to bulk polymerization to obtain a composite that includes a resin formed article and the support.

A known mold may be used as the mold used for the method (b). The shape, the material, and the size of the mold are not particularly limited.

When using the mold, the polymerizable composition is injected into the cavity of the mold, and heated and subjected to bulk polymerization to obtain a resin formed article.

A metal sheet (e.g., aluminum sheet or copper sheet) may be processed to have the desired shape by stamping or the like, and placed in the mold, and the polymerizable composition may be injected into the mold, and subjected to bulk polymerization. A resin formed article that is integrated with a metal sheet or the like can be obtained by the above method.

Alternatively, sheet-like molds (e.g., glass sheets or metal sheets) and a spacer having a specific thickness may be provided, and the polymerizable composition may be injected into a space formed by placing the sheet-like molds on either side of the spacer, and heated and subjected to bulk polymerization. A sheet-like or film-like resin formed article can be obtained by the above method.

When using the method (a) or (b), the heating temperature when polymerizing the polymerizable composition is normally 30 to 250° C., preferably 50 to 200° C., and more preferably 50 to 180° C. When the polymerizable composition includes the radical generator as the crosslinking agent, the heating temperature is normally a temperature equal to or less than the one-minute half-life temperature of the radical generator, preferably a temperature less than the one-minute half-life temperature of the radical generator by 10° C. or more, and more preferably a temperature less than the one-minute half-life temperature of the radical generator by 20° C. or more.

The polymerization time may be appropriately selected, but is normally 30 minutes or less, preferably 1 second to 20 minutes, and more preferably 10 seconds to 10 minutes.

A resin formed article that includes only a small amount of unreacted monomers can be obtained by heating the polymerizable composition under the above conditions.

When using the two-pack polymerizable composition, the desired resin formed article can be efficiently obtained by combining the following first to third steps with the method (a) or (b).

First step that mixes the cycloolefin monomer, the coupling agent (A) that has a cycloolefin structure, the coupling agent (B) that includes at least one compound represented by the formula (1) (provided that the coupling agent (B) excludes the coupling agent (A)), and the filler to obtain a mixture, and allows the mixture to stand at −10 to +100° C. for at least 4 hours to prepare a first pack The advantageous effect of the invention (i.e., the effect of the coupling agents (A) and (B) on the filler is synergistically improved, and a resin formed article that exhibits excellent heat resistance and impact resistance is obtained) can be achieved by aging the mixture within the specific temperature range to prepare the first pack.

The temperature employed when preparing the mixture is normally −10 to +100° C., and preferably 0 to 50° C. When aging the mixture, the mixture may be allowed to stand in air or an inert gas (e.g., nitrogen or argon). The aging temperature is normally −10 to +100° C., preferably 0 to 50° C., and more preferably 15 to 30° C. The aging time is 4 hours or more. The upper limit of the aging time may be set arbitrarily. If the aging temperature is less than the above temperature range, the coupling agents (A) and (B) may not sufficiently react with the filler. If the aging temperature is more than the above temperature range, a deterioration in workability (e.g., volatilization of the monomer) may occur. If the aging time is less than the above range, the coupling agents (A) and (B) may not sufficiently react with the filler, and the resulting formed article may exhibit poor properties, or a formed article may not be obtained.

Second Step that Prepares the Second Pack that Includes the Metathesis Polymerization Catalyst The second pack need not be maintained at −10 to +100° C. for 4 hours or more, differing from the first pack. Therefore, the second pack may be prepared immediately before performing the third step.

Third Step that Mixes the First Pack and the Second Pack to Prepare a Polymerizable Composition, and Subjects the Polymerizable Composition to Bulk Polymerization The third step may be implemented by (a) a method that mixes the first pack and the second pack to obtain the polymerizable composition according to one embodiment of the invention, applies the polymerizable composition to a support, and subjects the polymerizable composition to bulk polymerization, or (b) a method that mixes the first pack and the second pack to obtain the polymerizable composition according to one embodiment of the invention, injects the polymerizable composition into a mold, and subjects the polymerizable composition to bulk polymerization, for example.

It is preferable to employ the above bulk polymerization temperature and bulk polymerization time.

(2) Method for Producing Crosslinked Resin Formed Article

The crosslinked resin formed article according to one embodiment of the invention is obtained by subjecting the polymerizable composition (or a mixture of the first pack and the second pack when using the two-pack polymerizable composition) to bulk polymerization and crosslinking.

For example, a crosslinkable resin formed article may be obtained using the above method, and heated and crosslinked to obtain a crosslinked resin formed article. Alternatively, the polymerizable composition (or a mixture of the first pack and the second pack when using the two-pack polymerizable composition) may be subjected to bulk polymerization and crosslinked at the same time to obtain a crosslinked resin formed article.

The crosslinking reaction is effected by heating the crosslinkable resin formed article or the polymerizable composition. The heating temperature is normally set to be equal to or more than the temperature at which the crosslinking agent induces the crosslinking reaction. For example, when using the radical generator as the crosslinking agent, the heating temperature is normally a temperature equal to or more than the one-minute half-life temperature of the radical generator, preferably a temperature more than the one-minute half-life temperature of the radical generator by 5° C. or more, and more preferably a temperature more than the one-minute half-life temperature of the radical generator by 10° C. or more. The heating temperature is normally 100 to 300° C., and preferably 150 to 250° C.

The heating time is normally 0.1 to 180 minutes, preferably 0.5 to 120 minutes, and more preferably 1 to 60 minutes.

4) Laminate

A laminate according to one embodiment of the invention includes a layer formed of the resin formed article or the crosslinked resin formed article. An additional layer included in the laminate is not particularly limited. Examples of the additional layer include a layer formed of a metal or a resin.

The laminate may be obtained by the bulk polymerization method (a).

Alternatively, a sheet-like or film-like crosslinkable resin formed article may be obtained by the bulk polymerization method (b), stacked on another layer, and hot-pressed (crosslinked) to obtain a laminate that includes a layer formed of a crosslinked resin formed article.

The hot-pressing pressure is normally 0.5 to 20 MPa, and preferably 3 to 10 MPa. The hot-pressing may be performed under vacuum or reduced pressure. The hot-pressing may be performed using a known press having a flat press mold, or a press molding machine used for a sheet molding compound (SMC) or a bulk molding compound (BMC), for example.

The polymerizable composition, the crosslinked resin formed article, and the laminate according to the embodiments of the invention may suitably be used as a structural material (e.g., CFRP and adhesive), a coating material, a sealing material, an electronic/insulating material (e.g., insulating FRP, release film, and printed circuit board), an optical material (e.g., LED reflector, lens, and bulb cover), and the like.

EXAMPLES

The invention is further described below by way of examples. Note that the invention is not limited to the following examples.

The following compounds were used in examples and comparative examples.

Filler 1: aluminum hydroxide ("HIGILITE (registered trademark) H-320" manufactured by Showa Denko K.K.)
Coupling agent (A): 2-(2-norbornyl)ethyltrimethoxysilane
Coupling agent (B-1): phenyltrimethoxysilane (SP value of phenyl group: 9.98)
Coupling agent (B-2): n-hexadecyltrimethoxysilane (SP value of n-hexadecyl group: 7.85)
Coupling agent (C): vinyltrimethoxysilane (SP value of vinyl group: 7.0)
Coupling agent (D): N-phenyl-3-aminopropyltrimethoxysilane (SP value of N-phenyl-3-aminopropyl group: 10.3)
Dispersant: nonionic dispersant ("Rheodol (registered trademark) SPO-30V" manufactured by Kao Corporation)
Aging preventive: "Irganox (registered trademark) 565" manufactured by BASF Production Example 1

Preparation of Catalyst Solution

In a glass flask, 51 parts by weight of benzylidene(1,3-dimesitylimidazolin-2-ylidene)(tricyclohexylphosphine)ruthenium dichloride and 79 parts by weight of triphenylphosphine were dissolved in 952 parts by weight of toluene to obtain a catalyst solution.

Example 1

A reaction vessel was charged with a mixture of cycloolefin monomers (dicyclopentadiene:cyclopentadiene trimer=90:10 (weight ratio)), the filler 1, the coupling agent (A), the coupling agent (B-1), the aging preventive, and the dispersant in the amounts shown in Table 1, and the components were stirred and mixed using a homogenizer. The mixture contained in the reaction vessel was allowed to stand at 25° C. for 20 hours under a nitrogen atmosphere (aging) to prepare a monomer liquid.

After the addition of the catalyst solution obtained in Production Example 1 to the monomer liquid in an amount of 0.12 mL per 100 g of the monomer liquid, the mixture was stirred to obtain a polymerizable composition 1.

The polymerizable composition 1 was poured into a mold for forming a flat sheet (thickness: 1 mm, length: 100 mm, width: 100 mm) (i.e., a mold in which a pair of chromium-plated iron plates provided with a heater were placed on either side of a spacer approximately in the shape of the letter "C"). The polymerizable composition 1 was subjected to bulk polymerization by heating the mold for 5 minutes (front-side temperature: 160° C., back-side temperature: 160° C.) to produce a crosslinkable resin formed article.

Example 2

A polymerizable composition 2 was obtained in the same manner as in Example 1, except that the amounts of the coupling agent (A) and the coupling agent (B-1) were changed as shown in Table 1. A crosslinkable resin formed article was produced in the same manner as in Example 1, except that the polymerizable composition 2 was used.

Example 3

A polymerizable composition 3 was obtained in the same manner as in Example 1, except that the coupling agent (B-2) was used instead of the coupling agent (B-1). A crosslinkable resin formed article was produced in the same manner as in Example 1, except that the polymerizable composition 3 was used.

Comparative Examples 1 to 7

Polymerizable compositions 4 to 10 were obtained in the same manner as in Example 1, except that the components of the polymerizable composition and the preparation method were changed as shown in Table 1.

When a resin formed article was produced in the same manner as in Example 1 using the polymerizable compositions 4 to 10, a polymerization reaction did not sufficiently proceed in Comparative Example 1 (polymerizable composition 4), Comparative Example 4 (polymerizable composition 7), Comparative Example 5 (polymerizable composition 8), and Comparative Example 7 (polymerizable composition 10).

The heat resistance and the impact resistance were evaluated by the following methods using the resin formed articles obtained in the examples and the comparative examples. The results are shown in Table 1.

(1) Heat Resistance (Measurement of Tg)

A specimen (width: 5 mm, length: 45 mm, thickness: 1 mm) sampled from the resin formed article was subjected to dynamic viscoelasticity measurement (temperature: room temperature to 300° C.) using a dynamic viscoelasticity tester ("EXSTAR DMS6100" manufactured by Seiko Instruments Inc.), and the Tg of the specimen was calculated from the peak value of tan δ at a frequency of 1 Hz.

(2) Impact Resistance (Charpy Impact Test)

The Charpy impact strength (flatwise, no notch, 23° C.) of the resin formed article was measured in accordance with JIS K 7111 to evaluate the impact resistance of the resin formed article.

TABLE 1

| | | Example | | | Comparative Example | | | | | | |
|---|---|---|---|---|---|---|---|---|---|---|---|
| | | 1 | 2 | 3 | 1 | 2 | 3 | 4 | 5 | 6 | 7 |
| First pack | Dicyclopentadiene | 90 | 90 | 90 | 90 | 90 | 90 | 90 | 90 | 90 | 90 |
| | Cyclopentadiene trimer | 10 | 10 | 10 | 10 | 10 | 10 | 10 | 10 | 10 | 10 |
| | Filler 1 | 200 | 200 | 200 | 200 | 200 | 200 | 200 | 200 | 200 | 200 |
| | Coupling agent (A) | 0.5 | 0.25 | 0.5 | — | 1.0 | — | 1.0 | 1.0 | 0.5 | — |
| | Coupling agent (B-1) | 0.5 | 0.75 | — | — | — | 1.0 | — | — | — | — |
| | Coupling agent (B-2) | — | — | 0.5 | — | — | — | — | — | — | — |
| | Coupling agent (C) | — | — | — | — | — | — | — | — | 0.5 | — |
| | Coupling agent (D) | — | — | — | — | — | — | — | — | — | 0.5 |
| | Aging preventive | 0.5 | 0.5 | 0.5 | 0.5 | 0.5 | 0.5 | 0.5 | 0.5 | 0.5 | 0.5 |
| | Dispersant | 1 | 1 | 1 | 1 | 1 | 1 | 1 | 1 | 1 | 1 |
| Second pack | Metathesis polymerization catalyst | 0.8 | 0.8 | 0.8 | 0.8 | 0.8 | 0.8 | 0.8 | 0.8 | 0.8 | 0.8 |
| Ratio (coupling agent (A)/coupling agent (B)) of coupling agent (A) to coupling agent (B) | | 1 | 0.33 | 1 | — | — | — | — | — | — | — |
| | Aging time (h) of first pack | 20 | 20 | 20 | 0 | 20 | 20 | 3 | 0 | 20 | 20 |
| | Tg (° C.) | 158 | 149 | 140 | — | 78 | 146 | — | — | 123 | — |
| | Charpy impact strength (kJ/mm$^2$) | 6.8 | 5.1 | 5.5 | — | 5.9 | 3.1 | — | — | 5.0 | — |

The unit for the amount of each component is parts by weight.
The amount (parts by weight) of the coupling agent is based on 100 parts by weight of the filler.
The amount (mmol) of the metathesis polymerization catalyst is based on 1 mol of the cycloolefin monomer.

In Examples 1, 2, and 3, a resin formed article that exhibited excellent heat resistance (high Tg) and excellent impact resistance could be obtained.

In Comparative Examples 1, 4, 5, and 7, polymerization was inhibited, and a rubbery product was obtained. Therefore, the properties were not measured. The resin formed articles obtained in Comparative Examples 2 and 6 exhibited poor heat resistance (low Tg), and the resin formed article obtained in Comparative Example 3 exhibited poor impact resistance.

The invention claimed is:

1. A polymerizable composition comprising a cycloolefin monomer, a coupling agent (A) that has a cycloolefin structure, a coupling agent (B) that includes at least one compound represented by a formula (1) (provided that the coupling agent (B) excludes the coupling agent (A)), a filler, and a metathesis polymerization catalyst, a weight ratio (coupling agent (A)/coupling agent (B)) of the coupling agent (A) to the coupling agent (B) being 0.1 to 1.5, $$(X)_{n-m}\text{-M-}(Y)_m \quad (1)$$

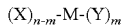

wherein M is a silicon atom, a titanium atom, an aluminum atom, or a zirconium atom, X is a hydrolyzable group, Y is a hydrocarbon group having 1 to 50 carbon atoms that is unsubstituted or substituted with a substituent that includes an oxygen atom, a nitrogen atom, a sulfur atom, a halogen atom, or a silicon atom, provided that at least one Y is a group having a solubility parameter value (SP value) of 7.5 to 10, m is an integer from 1 to 3, and n is a valence of M.

2. The polymerizable composition according to claim 1, further comprising a dispersant.

3. The polymerizable composition according to claim 1, wherein the compound represented by the formula (1) is a compound in which Y in the formula (1) is a group that does not include an active hydrogen group.

4. A two-pack polymerizable composition comprising a first pack and a second pack, the polymerizable composition according to claim 1 being divided into the first pack and the second pack, the first pack including the cycloolefin monomer, the coupling agent (A), the coupling agent (B), and the filler, and the second pack including the metathesis polymerization catalyst.

5. A crosslinkable resin formed article obtained by subjecting the polymerizable composition according to claim 1 to bulk polymerization.

6. A crosslinked resin formed article obtained by subjecting the polymerizable composition according to claim 1 to bulk polymerization and crosslinking.

7. A laminate comprising a layer formed of the crosslinkable resin formed article according to claim 5.

8. A method for producing a resin formed article comprising:

a first step that mixes a cycloolefin monomer, a coupling agent (A) that has a cycloolefin structure, a coupling agent (B) that includes at least one compound represented by a formula (1) (provided that the coupling agent (B) excludes the coupling agent (A)), and a filler to obtain a mixture, and allows the mixture to stand at −10 to +100° C. for at least 4 hours to prepare a first pack, $$(X)_{n-m}\text{-M-}(Y)_m \quad (1)$$

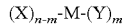

wherein M is a silicon atom, a titanium atom, an aluminum atom, or a zirconium atom, X is a hydrolyzable group, Y is a hydrocarbon group having 1 to 50 carbon atoms that is unsubstituted or substituted with a substituent that includes an oxygen atom, a nitrogen atom, a sulfur atom, a halogen atom, or a silicon atom, provided that at least one Y is a group having a solubility parameter value (SP value) of 7.5 to 10, m is an integer from 1 to 3, and n is a valence of M;

a second step that prepares a second pack that includes a metathesis polymerization catalyst; and a third step that mixes the first pack and the second pack to prepare a polymerizable composition, and subjects the polymerizable composition to bulk polymerization.

9. The polymerizable composition according to claim 2, wherein the compound represented by the formula (1) is a compound in which Y in the formula (1) is a group that does not include an active hydrogen group.

10. A two-pack polymerizable composition comprising a first pack and a second pack, the polymerizable composition according to claim 2 being divided into the first pack and the second pack, the first pack including the cycloolefin monomer, the coupling agent (A), the coupling agent (B), and the filler, and the second pack including the metathesis polymerization catalyst.

11. A two-pack polymerizable composition comprising a first pack and a second pack, the polymerizable composition according to claim 3 being divided into the first pack and the second pack, the first pack including the cycloolefin monomer, the coupling agent (A), the coupling agent (B), and the filler, and the second pack including the metathesis polymerization catalyst.

12. A crosslinkable resin formed article obtained by subjecting the polymerizable composition according to claim 2 to bulk polymerization.

13. A crosslinkable resin formed article obtained by subjecting the polymerizable composition according to claim 3 to bulk polymerization.

14. A crosslinkable resin formed article obtained by subjecting a mixture of the first pack and the second pack included in the two-pack polymerizable composition according to claim 4 to bulk polymerization.

15. A crosslinked resin formed article obtained by subjecting the polymerizable composition according to claim 2 to bulk polymerization and crosslinking.

16. A crosslinked resin formed article obtained by subjecting the polymerizable composition according to claim 3 to bulk polymerization and crosslinking.

17. A crosslinked resin formed article obtained by subjecting a mixture of the first pack and the second pack included in the two-pack polymerizable composition according to claim 4 to bulk polymerization and crosslinking.

18. A laminate comprising a layer formed of the crosslinked resin formed article according to claim 6.

* * * * *